(12) United States Patent
Oak et al.

(10) Patent No.: US 11,343,739 B2
(45) Date of Patent: *May 24, 2022

(54) METHOD AND APPARATUS FOR CONTROLLING HANDOVER IN WIRELESS COMMUNICATION SYSTEM

(71) Applicant: Samsung Electronics Co., Ltd., Gyeonggi-do (KR)

(72) Inventors: Jeongyeob Oak, Gyeonggi-do (KR); Jisoo Song, Gyeonggi-do (KR); Wonil Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/983,436

(22) Filed: Aug. 3, 2020

(65) Prior Publication Data

US 2020/0367126 A1 Nov. 19, 2020

Related U.S. Application Data

(63) Continuation of application No. 16/421,816, filed on May 24, 2019, now Pat. No. 10,736,008, which is a
(Continued)

(51) Int. Cl.
*H04W 36/08* (2009.01)
*H04W 36/00* (2009.01)
(Continued)

(52) U.S. Cl.
CPC ....... *H04W 36/08* (2013.01); *H04W 36/0055* (2013.01); *H04W 4/70* (2018.02);
(Continued)

(58) Field of Classification Search
CPC ........ H04W 36/00; H04W 4/70; H04W 74/08
See application file for complete search history.

(56) References Cited

U.S. PATENT DOCUMENTS 8,432,812 B2 4/2013 Park et al.
2016/0345204 A1 11/2016 Godin et al.
(Continued)

FOREIGN PATENT DOCUMENTS

KR 1020110097949 8/2011

OTHER PUBLICATIONS

LG Electronics Inc., "Issue on Retransmission for Lost RLC PDUs", R3-170982, 3GPP TSG-RAN WG3 Meeting #95bis, Apr. 3-7, 2017, 3 pages.
(Continued)

*Primary Examiner* — Kent Krueger
(74) *Attorney, Agent, or Firm* — The Farrell Law Firm, P.C.

(57) ABSTRACT

A method and apparatus are provided that controls the handover between DUs in an eNB including a CU and a DU. The method and system fuses 5G communication systems with IoT technology to transmission data at a high rate after 4G systems. The communication method and system is applied to intelligent services, based on 5G communication technology and IoT related technology. The method includes transmitting, to a source DU of the base station, a first message related to a handover; receiving, from the source DU, a second message for downlink data delivery information related to a PDU transmitted from the source DU to a terminal; receiving, from a target DU of the base station, a third message based on a random access procedure of the terminal toward the target DU; and transmitting, to the target DU, downlink data based on the downlink data delivery information after receiving the third message.

24 Claims, 6 Drawing Sheets

Related U.S. Application Data continuation of application No. 15/593,829, filed on May 12, 2017, now Pat. No. 10,306,526.

(51) Int. Cl.
  *H04W 84/04*    (2009.01)
  *H04W 74/08*    (2009.01)
  *H04W 4/70*     (2018.01)
  *H04W 88/08*    (2009.01)

(52) U.S. Cl.
  CPC ...... *H04W 74/0833* (2013.01); *H04W 84/042* (2013.01); *H04W 88/085* (2013.01)

(56) References Cited

U.S. PATENT DOCUMENTS

| | | |
|---|---|---|
| 2017/0230875 A1 | 8/2017 | Tavildar |
| 2017/0332283 A1 | 11/2017 | Kubota |
| 2020/0336951 A1 | 10/2020 | Ahluwalia |

OTHER PUBLICATIONS

Huawei, HiSilicon, "Discussions on Enhancement of Retransmissions over F1 Interface", R3-171814, NB3GPP TSG RAN WG3 Meeting #96, May 15-19, 2017, 2 pages.
Korean Office Action dated May 3, 2021 issued in counterpart application No. 10-2017-0059615, 14 pages.
Korean Office Action dated Jan. 3, 2022 issued in counterpart application No. 10-2017-0059615, 11 pages.

METHOD AND APPARATUS FOR CONTROLLING HANDOVER IN WIRELESS COMMUNICATION SYSTEM

CROSS-REFERENCE TO RELATED APPLICATION(S)

This application is a Continuation of U.S. patent application Ser. No. 16/421,816, which was filed in the U.S. Patent and Trademark Office on May 24, 2019, which is a Continuation of U.S. patent application Ser. No. 15/593,829, which was filed in the U.S. Patent and Trademark Office on May 12, 2017, and issued as U.S. Pat. No. 10,306,526 on May 28, 2019, the entire content of each of which is incorporated herein by reference.

BACKGROUND

1. Field of the Invention

Embodiments of the present disclosure relate to a method and apparatus for controlling handover in a wireless communication system. More particularly, embodiments of the present disclosure relate to a method and apparatus for controlling the handover between distributed units (DUs) (inter-DU handover) in an evolved node B (eNB) including a central unit (CU) and a distributed unit (DU).

2. Description of Related Art

In order to meet the increase in the demand for wireless data traffic after the commercialization of 4G communication systems, considerable effort has been made to develop pre-5G communication systems or improved 5G communication systems. This is one reason why '5G communication systems' or 'pre-5G communication systems' are called 'beyond 4G network communication systems' or 'post LTE systems.' In order to achieve a high data transmission rate, 5G communication systems are being developed to be implemented in a band of extremely high frequency, or millimeter wave (mmWave), e.g., a band of 60 GHz. In order to reduce the occurrence of stray electric waves in a band of extremely high frequency energy and to increase the transmission distance of electric waves in 5G communication systems, various technologies being explored, for example: beamforming, massive MIMO, Full Dimensional MIMO (FD-MIMO), array antennas, analog beam-forming, large scale antennas, etc. In order to improve system networks for 5G communication systems, various technologies have been developed, e.g., evolved small cell, advanced small cell, cloud radio access network (cloud RAN), ultra-dense network, Device to Device communication (D2D), wireless backhaul, moving network, cooperative communication, Coordinated Multi-Points (CoMP), interference cancellation, etc. In addition, for 5G communication systems, other technologies have been developed, e.g., Hybrid FSK and QAM Modulation (FQAM) and Sliding Window Superposition Coding (SWSC), as Advanced Coding Modulation (ACM), Filter Bank Multi Carrier (FBMC), non-orthogonal multiple access (NOMA), sparse code multiple access (SCMA), etc.

The Internet has evolved from a human-based connection network, where humans create and consume information, to the Internet of Things (IoT) where distributed configurations, such as objects, exchange information with each other to process the information. The technology related to the IoT is starting to be combined with, for example, a technology for processing big data through connection with a cloud server, and this is called an Internet of Everything (IoE) technology. In order to manifest the IoT, various technical components are required, such as, a sensing technology, wired/wireless communication and network infra technology, a service interfacing technology, a security technology, etc. In recent years, a sensor network for connecting objects, Machine to Machine (M2M), Machine Type Communication (MTC), etc. have been researched. Under the IoT environment, intelligent Internet Technology (IT) services may be provided to collect and analyze data obtained from objects connected to each other and thus to create new value for human life. As existing information technologies are fused and combined with various industries, the IoT may also be applied within various fields, such as: smart homes, smart buildings, smart cities, smart cars or connected cars, smart grids, health care, smart home appliances, high quality medical services, etc.

To this end, various attempts have been made to apply 5G communication systems to the IoT. For example, various technologies related to sensor networks, Machine to Machine (M2M), Machine Type Communication (MTC), etc., have been implemented by beam-forming, MIMO, array antenna, etc., as 5G communication technology. The application of the cloud RAN as a big data processing technology described above may be an example of a hybrid of 5G technology and IoT technology.

In communication systems described above, a number of nodes may perform operations of an eNB. More specifically, nodes may perform operations related to an eNB, based on central units (CUs) and distributed units (DUs). Therefore, communication systems need to set a signaling method between a CU and a DU in order to smoothly provide services.

SUMMARY

The present invention has been made to address the above problems and disadvantages, and to provide at least the advantages described below. Accordingly, embodiments of the present disclosure provide: a method of smoothly performing the handover between distributed units (DUs) (inter-DU handover) by signaling with a central unit (CU) in a communication providing services through CUs and DUs; and an apparatus adapted to the method.

In accordance with an aspect of the present invention, a method is provided for a CU of a base station. The method includes transmitting, to a source DU of the base station, a first message related to a handover; receiving, from the source DU, a second message for downlink data delivery information related to a packet data unit (PDU) transmitted from the source DU to a terminal; receiving, from a target DU of the base station, a third message based on a random access procedure of the terminal toward the target DU; and in response to receiving the third message, transmitting downlink data to the target DU based on the downlink data delivery information, before receiving a fourth message associated with a radio resource control (RRC) reconfiguration complete based on the random access procedure of the terminal from the target DU.

In accordance with another aspect of the present invention, a method is provided for a source DU of a base station. The method includes receiving, from a CU of the base station, a first message related to a handover; and transmitting, to the CU, a second message for downlink data delivery information related to a packet data unit (PDU) transmitted to a terminal. A third message is transmitted from a target DU of the base station to the CU based on a random access procedure of the terminal toward the target DU. In response to a reception of the third message at the CU, downlink data is transmitted from the CU to the target DU based on the downlink data delivery information, before a fourth message associated with a radio resource control (RRC) reconfiguration complete based on the random access procedure of the terminal is received at the CU.

In accordance with another aspect of the present invention, a method is provided for a target DU of a base station. The method includes transmitting, to a CU of the base station, if a first message related to a handover is transmitted from the CU of the base station to a source DU of the base station and a second message for downlink data delivery information related to a packet data unit (PDU) transmitted from the source DU to a terminal is transmitted from the source DU to the CU, a third message based on a random access procedure of the terminal toward the target DU; and in response to a reception of the third message at the CU, receiving downlink data from the CU based on the downlink data delivery information, before transmitting a fourth message associated with a radio resource control (RRC) reconfiguration complete based on the random access procedure of the terminal to the CU.

In accordance with another aspect of the present invention, a CU of a base station is provided. The CU includes a transceiver; and a controller, which is configured to control the transceiver to transmit, to a source DU of the base station, a first message related to a handover, receive, from the source DU, a second message for downlink data delivery information related to a packet data unit (PDU) transmitted from the source DU to a terminal, receive, from a target DU of the base station, a third message based on a random access procedure of the terminal toward the target DU, and in response to receiving the third message, transmit downlink data to the target DU based on the downlink data delivery information, before receiving a fourth message associated with a radio resource control (RRC) reconfiguration complete based on the random access procedure of the terminal from the target DU.

In accordance with another aspect of the present invention, a source DU of a base station is provided. The source DU includes a transceiver; and a controller, which is configured to control the transceiver to receive, from a CU of the base station, a first message related to a handover, and transmit, to the CU, a second message for downlink data delivery information related to a packet data unit (PDU) transmitted to a terminal. A third message is transmitted from a target DU of the base station to the CU based on a random access procedure of the terminal toward the target DU. In response to a reception of the third message at the CU, downlink data is transmitted from the CU to the target DU, based on the downlink data delivery information, before a fourth message associated with a radio resource control (RRC) reconfiguration complete based on the random access procedure of the terminal is received at the CU.

In accordance with another aspect of the present invention, a target DU of a base station is provided. The target DU includes a transceiver; and a controller, which is configured to control the transceiver to transmit, to a CU of the base station, if a first message related to a handover is transmitted from the CU of the base station to a source DU of the base station and a second message for downlink data delivery information related to a packet data unit (PDU) transmitted from the source DU to a terminal is transmitted from the source DU to the CU, a third message based on a random access procedure of the terminal toward the target DU; and in response to a reception of the third message at the CU, receive downlink data from the CU based on the downlink data delivery information, before transmitting a fourth message associated with a radio resource control (RRC) reconfiguration complete based on the random access procedure of the terminal to the CU.

In accordance with another aspect of the present invention, a method is provided for a CU of a base station. The method includes transmitting, to a source DU of the base station, a first message related to a handover; receiving, from the source DU, a second message for downlink data delivery information related to a packet data unit (PDU) transmitted from the source DU to a terminal; receiving, from a target DU of the base station, a third message based on a random access procedure of the terminal toward the target DU; and transmitting, to the target DU, downlink data based on the downlink data delivery information after receiving the third message.

In accordance with another aspect of the present invention, a method is provided for a target DU of a base station. The method includes transmitting, to a CU of the base station, if a first message related to a handover is transmitted from the CU of the base station to a source DU of the base station and a second message for downlink data delivery information related to a packet data unit (PDU) transmitted from the source DU to a terminal is transmitted from the source DU to the CU, a third message based on a random access procedure of the terminal toward the target DU; and receiving, from the CU, downlink data based on the downlink data delivery information after a reception of the third message at the CU.

In accordance with another aspect of the present invention, a CU of a base station is provided. The CU includes a transceiver; and a controller, which is configured to control the transceiver to transmit, to a DU of the base station, a first message related to a handover, receive, from the source DU, a second message for downlink data delivery information related to a packet data unit (PDU) transmitted from the source DU to a terminal, receive, from a target DU of the base station, a third message based on a random access procedure of the terminal toward the target DU, and transmit, to the target DU, downlink data based on the downlink data delivery information after a reception of the third message.

In accordance with another aspect of the present invention, a target DU of a base station is provided. The target DU includes a transceiver; and a controller, which is configured to control the transceiver to transmit, to a CU of the base station, if a first message related to a handover is transmitted from the CU of the base station to a source DU of the base station and a second message for downlink data delivery information related to a packet data unit (PDU) transmitted from the source DU to a terminal is transmitted from the source DU to the CU, a third message based on a random access procedure of the terminal toward the target DU, and receive, from the CU, downlink data based on the downlink data delivery information after a reception of the third message at the CU.

BRIEF DESCRIPTION OF THE DRAWINGS

The above and other aspects, features and advantages of the invention will be more apparent from the following detailed description, taken in conjunction with the accompanying drawings, in which.

DETAILED DESCRIPTION OF EMBODIMENTS OF THE INVENTION

Figure 1:
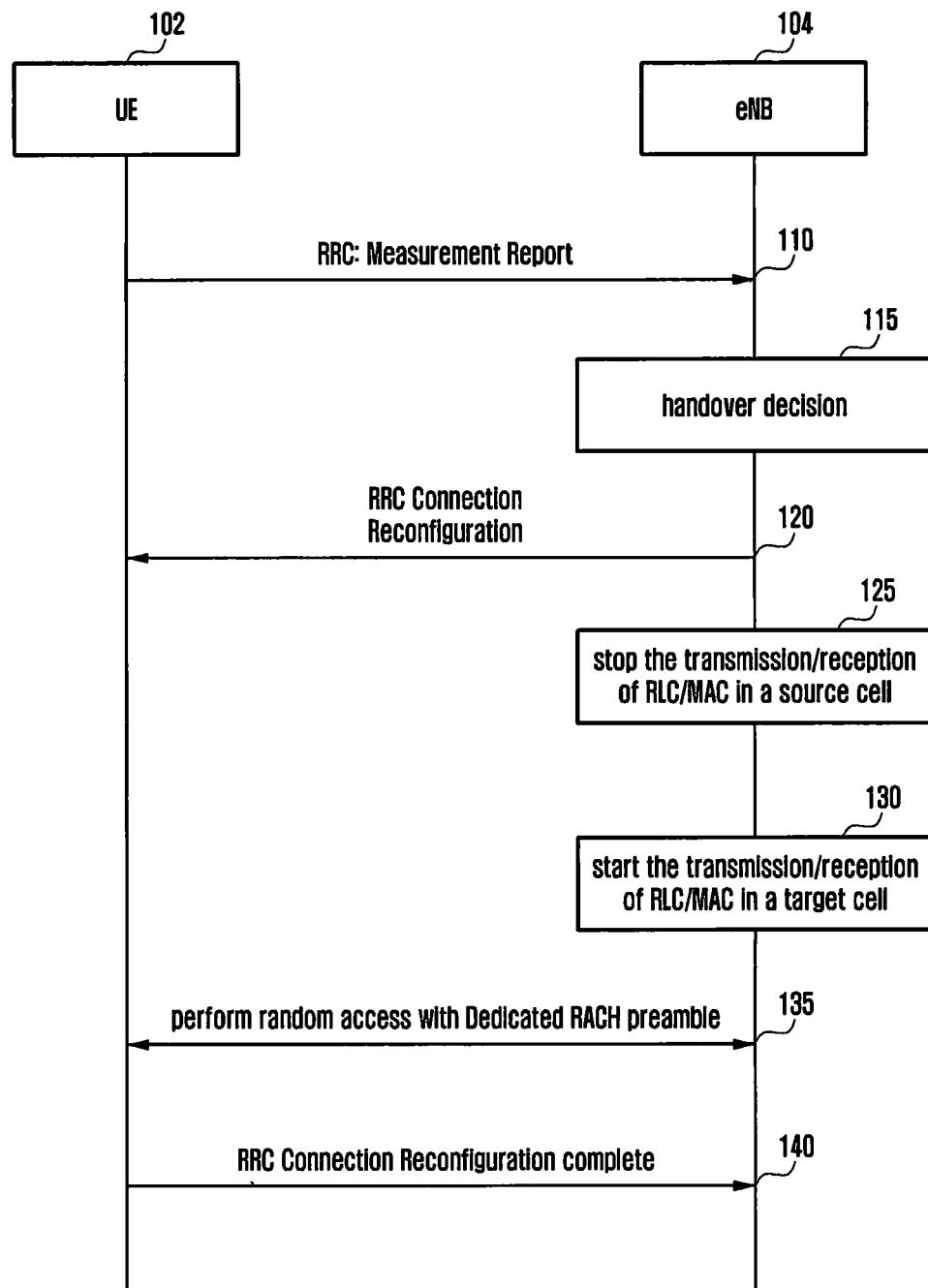
FIG. 1 is a flow diagram that describes a method of performing the transmission/reception of signals between a base station (eNB) and terminal (or user equipment (UE)) when performing inter-cell handover of UE according to embodiments of the present disclosure.

Hereinafter, embodiments of the present invention are described in detail with reference to the accompanying drawings.

In the embodiments, detailed descriptions of the technical content which is well-known and is not directly related to the embodiments of the present disclosure are omitted to avoid obscuring the subject matter of the invention, thereby highlighting the subject matter of the invention more clearly.

Similarly, the drawings are not necessarily to scale and certain features may be exaggerated, omitted, or simplified in order to better illustrate and explain the invention. The same reference numbers are used throughout the drawings to refer to the same or corresponding parts.

The features and advantages of the invention and the methods to accomplish the objectives of the invention will become more apparent from the following detailed description and the accompanying drawings. Although embodiments of the invention have been described in detail, it should be understood that many variations and modifications of the basic inventive concept herein described, which may be apparent to those skilled in the art, will still fall within the spirit and scope of the exemplary embodiments of the invention as defined in the appended claims. The same reference numbers are used throughout the drawings to refer to the same parts.

In addition, it should be understood that the blocks in the signal flowcharts and the combinations in the flowcharts can be performed via computer programming instructions. These computer programming instructions can be installed to processors of data processing equipment that can be programmed, special computers, or universal computers. The instructions, performed via the processors of data processing equipment or the computers, can create means that perform functions described in blocks of the flow charts. In order to implement functions in a particular mode, the computer programming instructions can be stored in a computer available memory or computer readable memory that can support computers or data processing equipment that can be programmed. Therefore, the instructions, stored in the computer available memory or computer readable memory, can be installed to the products, and perform the functions described in the block(s) of the flow charts. In addition, since the computer programming instructions can also be installed to computers or data processing equipment that can be programmed, they can create computer-executable processes as a series of operations are performed therein, described in the block(s) of the flow charts therein.

The blocks of the flow charts refer to part of codes, segments or modules that include one or more executable instructions to perform one or more logic functions. It should be noted that the functions described in the blocks of the flow charts may be performed in a different order from the embodiments. For example, the functions described in two adjacent blocks may be performed at the same time or in reverse order.

In the embodiments, the terminology, component '~ unit,' refers to a software element or a hardware element such as an FPGA, an ASIC, etc., and performs a corresponding function. It should be, however, understood that the component '~unit' is not limited to a software or hardware element. The component '~unit' may be implemented in storage media that can be designated by addresses. The component '~unit' may also be configured to regenerate one or more processors. For example, the component '~unit' may include various types of elements (e.g., software elements, object-oriented software elements, class elements, task elements, etc.), processes, functions, attributes, procedures, sub-routines, segments of program codes, drivers, firmware, micro-codes, circuit, data, data base, data structures, tables, arrays, and variables. Functions provided by elements and the components '~units' may be formed by combining the small number of elements and components '~units' or may be divided into additional elements and components '~units.' In addition, elements and components '~units' may also be implemented to regenerate one or more CPUs in devices or security multi-cards.

Embodiments of the present disclosure provide a control method of supporting efficient UE mobility in an eNB employing the architecture of separation of a central unit (CU) and a distributed unit (DU). In embodiments, a CU and a DU may be referred to as units included in independent eNBs or the same eNB, respectively. Alternatively, in another embodiment, a CU and a DU may be configured with different network entities, respectively.

FIG. 1 is a flow diagram that describes a method of performing the transmission/reception of signals between a base station (evolved node B, eNB) and terminal (user equipment, UE) when performing inter-cell handover of UE according to embodiments of the present disclosure.

With reference to FIG. 1, UE 102 is capable of transmitting/receiving signals to/from an eNB 104. More specifically, UE 102 is capable of transmitting/receiving signals for handover between cells controlled by an eNB 104.

UE 102 is capable of transmitting a measurement report to the eNB 104 in operation 110, in the embodiment, the measurement report may be transmitted via a radio resource control (RRC) message.

The eNB 104 is capable of determining whether it needs to perform the handover of UE 102, based on the received measurement report in operation 115.

If the eNB 104 ascertains that it needs to perform the handover of UE 102 in operation 115, the eNB 104 is capable of transmitting an RRC Connection Reconfiguration message to the UE 102 in operation 120. More specifically, the eNB 104 performs a preparation process for handover and then transmits an RRC Connection Reconfiguration message to the UE 102.

The eNB 104 is capable of stopping the transmission/reception of data between a radio link control (RLC) layer and a media access control (MAC) layer in a source cell, in response to the determination of the handover, in operation 125.

The eNB 104 is capable of performing operations related to the transmission of RLC/MAC layer data to UE, via a target cell, in response to the handover of UE 102 in operation 130.

The UE 102 is capable of performing a random access procedure including the transmission of a random access preamble to the eNB 104 in operation 135. In this case, the preamble may be a dedicated preamble.

The eNB 104 is capable of receiving an RRC connection reconfiguration complete message from the UE 102 in operation 140, and then transmits actual data to the UE 102. If the eNB 104 receives the message, it is capable of transmitting downlink data from the PDCP layer to the UE 102 via a target cell.

As described above, since the inter-cell handover operation is performed in the same eNB where RRC/PDCP/RLC/MAC layers exist, a source RLC/MAC is capable of detecting a timing when the data transmission needs to be stopped, and requesting, right after that, the resumption of transmission from a target RLC/MAC, thereby reducing the occurrence of the transmission delay or the data redundancy transmission.

Figure 2:
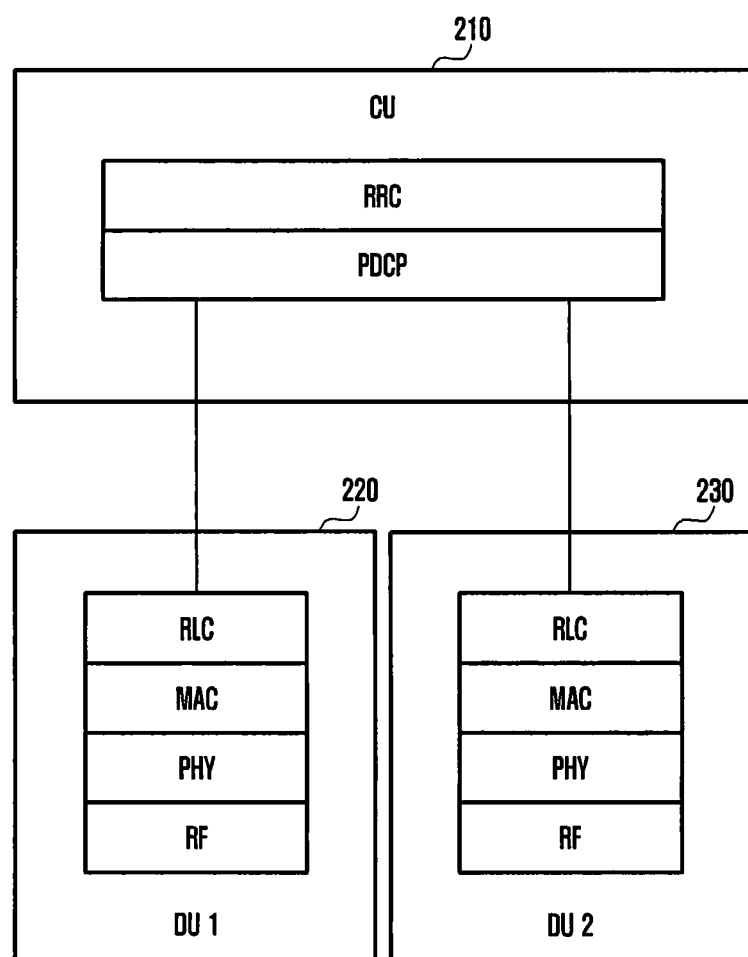
FIG. 2 is a diagram showing the architecture of layers of a CU and a DU according to embodiments of the present disclosure.

FIG. 2 is a diagram showing the architecture of layers of a CU and a DU according to embodiments of the present disclosure.

With reference to FIG. 2, in an eNB employing the architecture of separation of a central unit (CU) and a distributed unit, the architecture of connection of multiple DUs located below the same CU, with the protocol stack by layers, is shown.

The eNB is capable of including a CU 210 and DUs 220 and 230. Each of the units is capable of performing operations of the eNB. In the embodiment, each unit may be referred to as an independent eNB.

The CU 210 is capable of performing operations of RRC and PDCP layers, and transmitting/receiving signals to/from a number of DUs 220 and 230.

The DUs 220 and 230 are connected to the CU 210 and capable of receiving PDU from the PDCP layer. The DUs 220 and 230 are capable of performing operations of RLC, MAC, physical (PHY) and radio frequency (RF) layers.

It should be understood that the CU 210 and DUs 220 and 230 may also be implemented in different configuration. For example, the embodiment may be modified in such a way that radio-related layers of the DUs 220 and 230 may be separated to other nodes. It should be understood that the present invention is not limited to the embodiment and have various alternations and modifications without departing from the spirit of the present invention.

The CU 210 may be modified in such a way as to further include other layers or remove part of the layers; however, if the modification transmits/receives signals to/from a node performing operations related to the PDCP layer and operations of the RLC layer, embodiments related to the CU 210 of the present disclosure may also apply to the modification.

The DUs 220 and 230 may be modified in such a way as to further include other layers or remove part of the layers; however, if the modification transmits/receives signals to/from a node performing operations related to the RLC layer and operations of the PDCP layer, embodiments related to the DUs 220 and 230 of the present disclosure may also apply to the modification.

From the viewpoint of a device, nodes to which the embodiments are applied may also be called CU or DU.

As described above, the CU 210 is connected to a number of DUs 220 and 230. In order to perform the handover between DUs (inter DU handover), a signaling method needs to be set between the CU 210 and the DUs 220 and 230. More specifically, unlike the existing handover by a single eNB, since an eNB is separated into two network entities, CU and DU, and RLC/MAC layers are arranged in DUs, a lower layer informs a higher layer located in the CU of start and end timings of the packet transmission, and shares an end timing of the packet transmission in a source RLC/MAC with a target DU via the CU, and thus there may be a need to resume the data transmission fast.

If a handover procedure for the architecture of a single eNB is applied in order to perform the operations described above, lower layers of a source DU, RLC/MAC, do not know timings to end the handover procedure and to stop the packet transmission. In particular, although UE context has already moved from the source DU to a target DU, the source DU may perform the redundancy transmission of data, which is not necessary, and may also delay the timing to resume the data transmission.

Therefore, the CU informs a DU, in which an RLC/MAC layer is located, of the handover start timing, so that the PDU transmission in the source DU, which is unnecessary, can be stopped at an appropriate timing and the PDU transmission adapted to the target DU can be resumed, using PDU SN information shared between source/target DUs, thereby reducing a transmission delay of user data when the inter-DU handover is performed. In the embodiment based on the operation described above, if UE, connected to an eNB employing the architecture of CU-DU separation, performs the handover between different DUs in the same CU, the UE is capable of providing: the inter-DU handover for fast PDU retransmit; and also an early forwarding function to a target-DU for a PDCP PDU which has not been transmitted when a handover procedure is processed because of the inter-DU connection architecture in the CU.

Messages, which can be transmitted between CU and DU, are as follows.

1. Handover Start Indication (transmitted from CU to Source DU)
   Information to stop the DL data transmission of Source DU
   Information to trigger the transmission of Delivery Status to CU
2. Delivery Status (transmitted from source DU to CU)
   Information to notify CU of information regarding DL data that has not been transmitted
3. Dedicated RACH Preamble Detection Indication (transmitted from target DU to CU)
   Information to indicate a user plane function to prepare to forward user data to target DU
   Information to early forward a DL PDCP packet, including PDCP PDU which has not been transmitted, to a target DU The embodiment is capable of performing the handover between DUs connected to the same CU, employing the messages described above.

Figure 3:
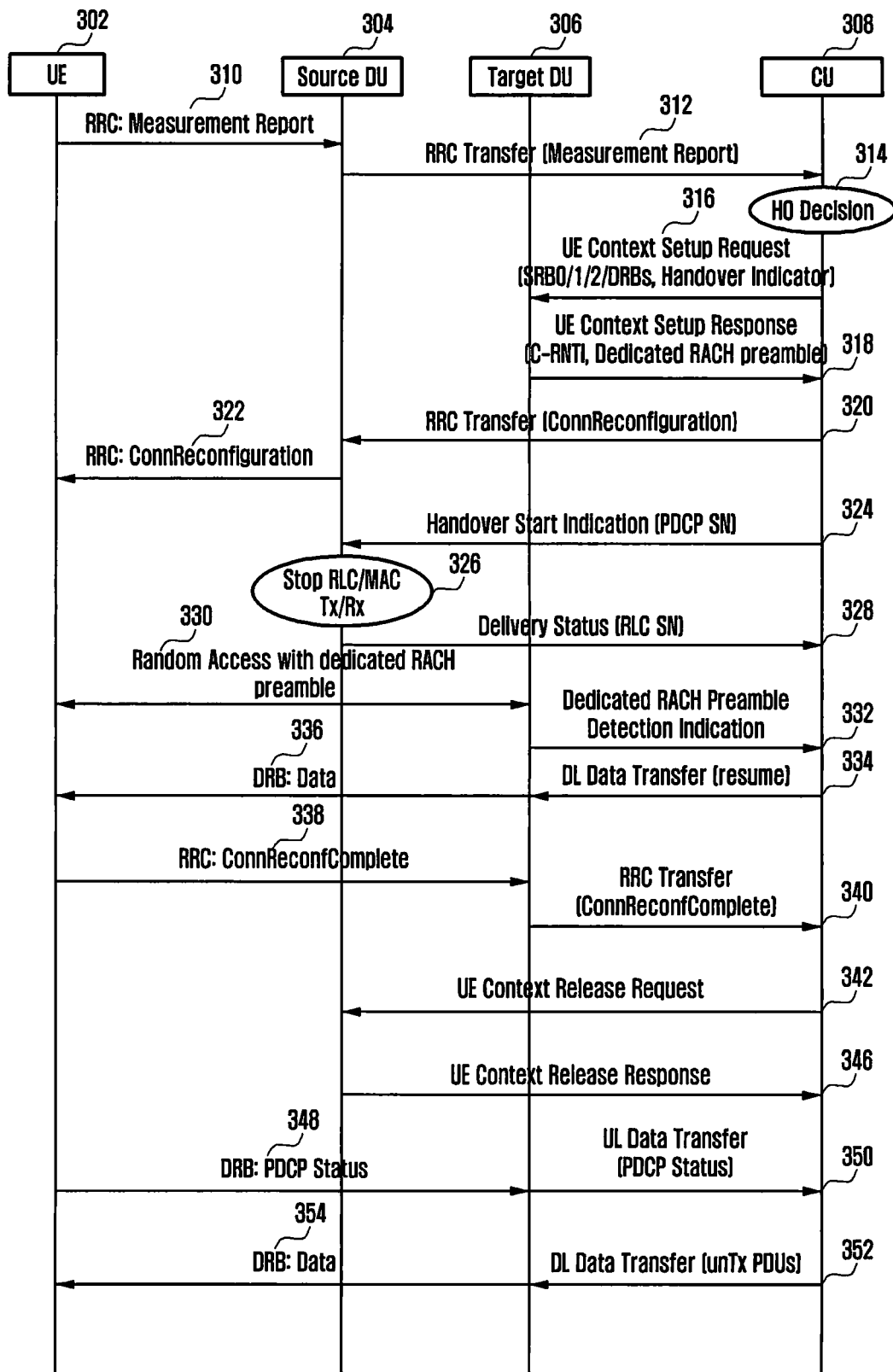
FIG. 3 is a flow diagram that describes a signaling method when inter-DU handover of UE is performed according to embodiments of the present disclosure.

FIG. 3 is a flow diagram that describes a signaling method when inter-DU handover of UE is performed according to embodiments of the present disclosure.

With reference to FIG. 3, UE 302 is capable of performing the handover from a source DU 304 connected to CU 308 to a target DU 306. To this end, the UE 302 starts a signaling procedure.

UE 302 is capable of transmitting, to the source DU 304, a Measurement Report including channel measurement information in operation 310.

The source DU 304 is capable of forwarding the received Measurement Report to the CU 308 in operation 312. More specifically, the source DU 304 forwards a Measurement Report to the CU 308 via an RRC TRANSFER message.

The CU 308 is capable of determining whether it performs the inter-DU handover, based on the received information in operation 314. In the embodiment, the CU 308 is capable of determining to perform the handover from the source DU 304 to the target DU 306.

The CU 308 transmits a message, UE CONTEXT SETUP REQUEST, to the target DU 306, thereby transmitting a handover indicator and RB information for the handover call setup in operation 316.

The target DU 306 is capable of transmitting a message, UE CONTEXT SETUP RESPONSE, to the CU in response to the response in operation 318. In the embodiment, the UE CONTEXT SETUP RESPONSE message may contain at least one of the following: C-RNTI and dedicated RACH information. In the embodiment, the CU 308 is capable of setting up a new UE context for handover to the target DU 306.

After setting up a new UE context to the target DU 306, the CU 308 is capable of transmitting, to the UE, an RRC Connection Reconfiguration message, via the RRC Transfer, through the source DU 304, in operations 320 and 322. The RRC Connection Reconfiguration message may contain at least one of the following: MAC/PHY information and RB for connecting to the target DU 306. In the embodiment, the RRC Connection Reconfiguration message may contain information related to the setup UE context.

The CU 308 is capable of transmitting a message indicating the handover start to the source DU 304 in operation 324. More specifically, the CU 308 is capable of transmitting a message indicating the handover start, HANDOVER START INDICATION including Delivery Status Indicator, to the source DU 304. In the embodiment, the Delivery Status Indicator may contain PDCP SN information regarding the first missing acknowledgement right after the last PDCP PDU, which is transmitted via the PDCP transmission and ascertained by the CU 308. Since a corresponding message is transmitted via a GTP-U, the GTP header contains GTP SN. After that, when the DU receives the HANDOVER START INDICATION message, the DU may obtain an RLC SN referring to the GTP SN value. In the embodiment, the HANDOVER START INDICATION message may contain information as in the following table 1.

TABLE 1

| | Description |
|---|---|
| IE Name | |
| CU UE ID | UE identification of CU |
| DU UE ID | UE identification of DU |
| RB list | |
| >>RB ID | Radio bearer identification for each UE context |
| >>Delivery Status Indicator | First missing PDCP sequence number which has not been received acknowledgement This information can be provided by PDCP layer of CU |

The source DU 304 is capable of stopping the DL data transmission in response to the reception of the HANDOVER START INDICATION message in operation 326. More specifically, the source DU 304 is capable of stopping the DL data transmission, based on information included in the HANDOVER START INDICATION.

The source DU 304 is capable of transmitting, to the CU 308, a message including information related to data transmitted to UE, DELIVERY STATUS, in operation 328. More specifically, the source DU 304 is capable of transmitting, to the CU 308, a DELIVERY STATUS message including information regarding the transmission of DL RLC PDU, In this case, the source DU 304 is capable of transmitting, to the CU 308, information regarding the RLC complete transmission which has been completed according to the reception of an acknowledgement in response to the DL RLC PDU and information regarding the RLC incomplete transmission which has not been completed because the acknowledgement has not been received. In the embodiment, the DELIVERY STATUS message may contain information as in the following table 2.

TABLE 2

| | Description |
|---|---|
| IE Name | |
| CU UE ID | UE identification of CU |
| DU UE ID | UE identification of DU |
| RB list | |
| >>RB ID | Radio bearer identification for each UE context |
| >>Delivery Status Report | RLC sequence number which has been received acknowledgement, Missing RLC sequence number which has not been received acknowledgement. This information can be provided by RLC layer of DU |

The UE 302 is capable of performing a random access procedure with the target DU 306 in operation 330. More specifically, the UE is capable of performing the random access to the target DU 306, using a dedicated preamble.

The target DU 306 is capable of transmitting, to the CU 308, a message containing information notifying the UE random access in operation 332. More specifically, the target DU 306 is capable of transmitting a message, DEDICATED RACH PREAMBLE DETECTION INDICATION, to the CU 308.

The CU 308 is capable of resuming the downlink data transmission to the UE 302 in operations 334 and 336. More specifically, the CU 308 is capable of resuming the downlink data transmission, based on information received in operations 328 and 332. In an embodiment, if the CU 308 receives a DELIVERY STATUS message from the source DU 304 and successfully performs the RACH procedure to the target DU 306 of the UE 302, the CU 308 is capable of performing the downlink data transmission based on the result. In this case, the CU 308 is capable of forwarding downlink packets to the target DU 306, via the DL Data Transfer, based on information related to packets transmitted from the source DU 304. The target DU 306 is capable of immediately transmitting the downlink packets to the UE 302 since the target DU 306 has performed a RACH procedure with the UE 302. As such, the embodiment resumes the transmission of data that the source DU 304 has been transmitting before the RRC connection reconfiguration is completed, thereby rapidly transmitting data. In an embodiment, the CU 308 may forward information related to downlink PDU to be transmitted to the target DU 306, based on information obtained in operation 328, in operation 334. In the embodiment, the DL PDCP PDU, transmitted to UE 302 as in operations 334 and 336, may include PDUs which are incompletely transmitted from the source DU 304, and thus this makes it possible tc fast transmission the DL PDCP PDU right after the inter-DU handover.

The UE 302 is capable of transmitting an RRCConnReconfComplete message to the target DU 306 based on a procedure after the random access in operation 338, and the target DU 306 is capable of transmitting the message to the CU 308 in operation 340.

If the UE 302 has established the connection with the target DU 306, the CU 308 is capable of transmitting a message for releasing UE context, UE Context Release Request, to the source DU 304 in operation 342. The source DU 304 is capable of transmitting the response message to the CU 308 in operation 346. The embodiment is capable of transmitting the UE Context Release Response message to the CU, thereby informing the CU of a condition as to whether the UE context release procedure is successfully performed.

If the CU 308 receives a PDCP status from the UE, via STATUS PDU, at a timing, the CU 308 processes packets which have not been transmitted during the fast resume operation and the DL PDCP PDU which has been received from a Core Network but is buffered in the CU 308 in operations 348 and 350. The CU 308 is capable of transmitting the DL PDCP PDU to the target DU 306 in operation 352. The target DU 306 is capable of forwarding the DL PDCP PDU to the UE in operation 354.

In the embodiment, the message as in operation 332 may be used for the early Radio Bearer resumption described above. If the message is not transmitted or is lost, the embodiment may resume the downlink data transmission after operation 338 or 340.

In the embodiment, after transmitting a HANDOVER START INDICATION message to the source DU 304, if the CU 308 has not received a response to the DELIVERY STATUS or has received an incorrect response from the source DU 304, the CU 308 may transmit DL Data after receiving a DEDICATED RACH PREAMBLE DETECTION INDICATION message and an RRC Connection Reconfiguration Complete message in operation 332.

Before the CU 308 receives PDCP PDU-related information that the UE 302 received as in operations 348 and 350, the embodiment of the present disclosure is capable of resuming the downlink data transmission as in operations 334, etc., thereby rapidly transmitting data.

Figure 4:
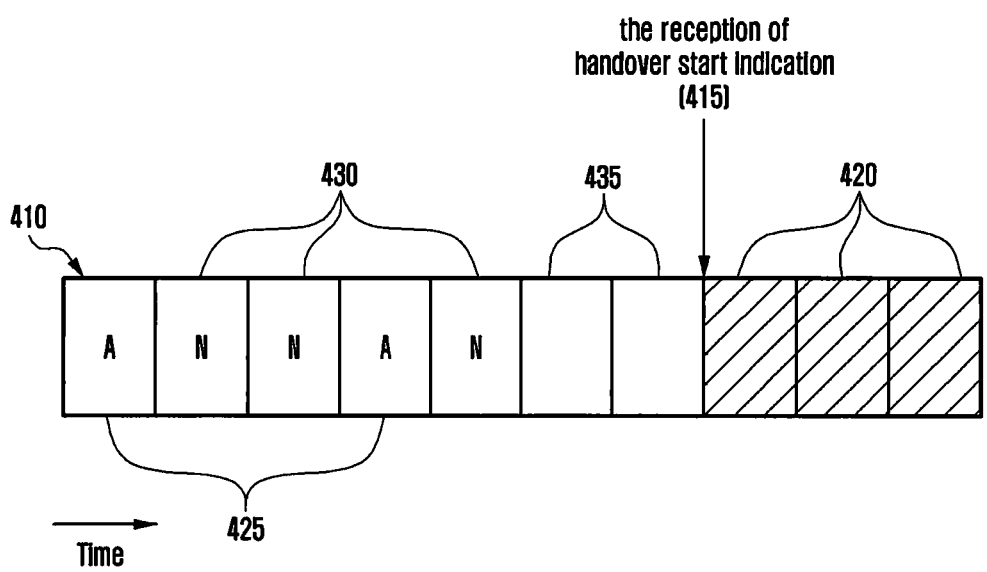
FIG. 4 is a diagram showing a packet data unit (PDU) transmitted when handover of UE is performed according to embodiments of the present disclosure.

FIG. 4 is a diagram showing a packet data unit (PDU) transmitted when handover of UE is performed according to embodiments of the present disclosure.

With reference to FIG. 4, a source DU starts with a downlink PDU which is transmitted. In the embodiment, the source DU is capable of transmitting the downlink PDU to UE. FIG. 4 shows PDU 425 that has received an acknowledgement, PDU 430 that has received a negative acknowledgement, and PDU 435 that has not received a response after the transmission.

In the embodiment, the source DU is capable of receiving handover start indication from a CU and stopping the downlink data transmission in response to the reception of the handover start indication as indicated by reference number 415. Therefore, the following PDU 420 may not be transmitted to the UE.

Therefore, the source DU is capable of transmitting, to the CU, information regarding the transmitted PDU. The information regarding the transmitted PDU may include at least one of the following: information regarding PDU succeeding in transmission, information regarding PDU failing in transmission, and information regarding PDU that has not received a response.

After receiving the information described above, the CU is capable of transmitting corresponding information to a target DU and resuming the transmission of downlink data to be transmitted to the UE.

Figure 5:
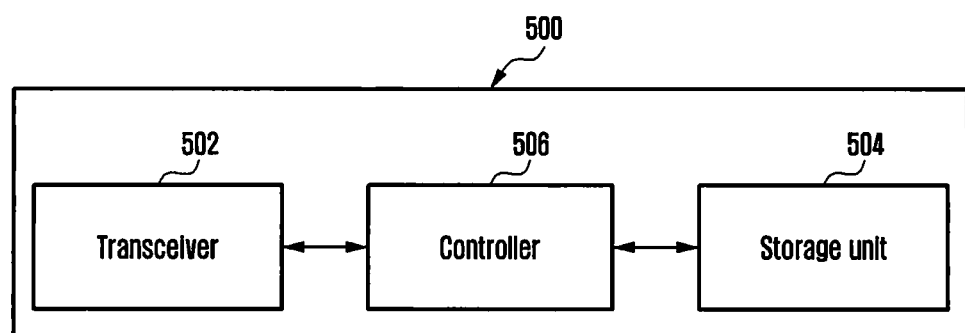
FIG. 5 is a block diagram of a DU according to embodiments of the present disclosure.

FIG. 5 is a block diagram of a DU according to embodiments of the present disclosure.

With reference to FIG. 5, a DU 500 of embodiments includes a transceiver 502, a storage unit 504 and a controller 506.

The transceiver 502 is capable of transmitting/receiving signals to/from UE and/or CU.

The storage unit 504 is capable of storing at least one of the following: information related to the DU 500 and information transmitted/received via the transceiver 502. In the embodiment, the storage unit 504 is capable of storing context information regarding UE and buffering transmission data.

The controller 506 is capable of controlling operations of the DU 500. The controller 506 is capable of controlling the DU to perform operations related to DUs as described in the embodiments. The controller 506 may include at least one processor.

Figure 6:
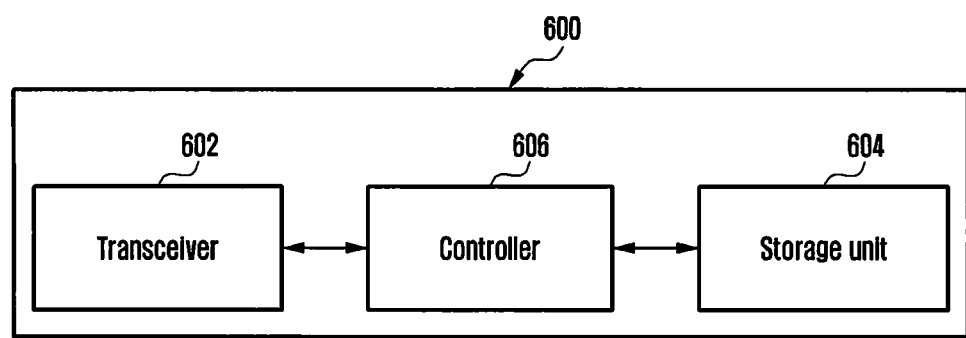
FIG. 6 is a block diagram of a CU according to embodiments of the present disclosure.

FIG. 6 is a block diagram of a CU according to embodiments of the present disclosure.

With reference to FIG. 6, a CU 600 of embodiments includes a transceiver 602, a storage unit 604 and a controller 606.

The transceiver 602 is capable of transmitting/receiving signals to/from UE and/or DUs.

The storage unit 604 is capable of storing at least one of the following: information related to the CU 600 and information transmitted/received via the transceiver 602. In the embodiment, the storage unit 604 is capable of storing context information regarding UE and buffering transmission data.

The controller 606 is capable of controlling operations of the CU 600. The controller 606 is capable of controlling the CU to perform operations related to CU as described in the embodiments. The controller 606 may include at least one processor.

As described above, when an eNB employing the architecture of separation of a central unit (CU) and a distributed unit (DU) performs the handover between distributed units (DUs) (inter-DU handover), embodiments of the present disclosure are capable of rapidly transmitting data during the handover. In addition, when an eNB employing the architecture of separation of a CU and a DU performs the handover, embodiments of the present disclosure are capable of securing the reliability of transmission, thereby reducing the signal overhead.

The terms and words used in the description and the drawings are not limited to the bibliographical meanings, but, are merely used by the inventor to enable a clear and consistent understanding of the present disclosure. Accordingly, it should be apparent to those skilled in the art that the description of various embodiments of the present disclosure is provided for illustration purpose only and not for the purpose of limiting the present disclosure as defined by the appended claims and their equivalents.

What is claimed is:
1. A method by a central unit (CU) of a base station, the method comprising:
transmitting, to a source distributed unit (DU) of the base station, a first message related to a handover;

receiving, from the source DU, a second message for downlink data delivery information related to a packet data unit (PDU) transmitted from the source DU to a terminal;

receiving, from a target DU of the base station, a third message based on a random access procedure of the terminal toward the target DU; and in response to receiving the third message, transmitting downlink data to the target DU based on the downlink data delivery information, before receiving a fourth message associated with a radio resource control (RRC) reconfiguration complete based on the random access procedure of the terminal from the target DU.

2. The method of claim 1, wherein the downlink data delivery information includes information on unsuccessfully transmitted downlink data to the terminal.

3. The method of claim 1, wherein the downlink data delivery information includes at least one of information on a successfully delivered packet or information on a lost packet.

4. The method of claim 1, wherein the first message includes packet data convergence protocol (PDCP) sequence number (SN) information for a first PDCP PDU, which is a first missing acknowledgement after a last PDCP PDU for which transmission has been confirmed.

5. A method by a source distributed unit (DU) of a base station, the method comprising:

receiving, from a central unit (CU) of the base station, a first message related to a handover; and transmitting, to the CU, a second message for downlink data delivery information related to a packet data unit (PDU) transmitted to a terminal, wherein a third message is transmitted from a target DU of the base station to the CU based on a random access procedure of the terminal toward the target DU, and wherein in response to a reception of the third message at the CU, downlink data is transmitted from the CU to the target DU based on the downlink data delivery information, before a fourth message associated with a radio resource control (RRC) reconfiguration complete based on the random access procedure of the terminal is received at the CU.

6. The method of claim 5, wherein the downlink data delivery information includes information on unsuccessfully transmitted downlink data to the terminal, and wherein the downlink data delivery information further includes at least one of information on a successfully delivered packet or information on a lost packet.

7. The method of claim 5, wherein the first message includes packet data convergence protocol (PDCP) sequence number (SN) information for a first PDCP PDU, which is a first missing acknowledgement after a last PDCP PDU for which transmission has been confirmed.

8. A method by a target distributed unit (DU) of base station, the method comprising:

transmitting, to a central unit (CU) of the base station, if a first message related to a handover is transmitted from the CU of the base station to a source distributed unit (DU) of the base station and a second message for downlink data delivery information related to a packet data unit (PDU) transmitted from the source DU to a terminal is transmitted from the source DU to the CU, a third message based on a random access procedure of the terminal toward the target DU; and in response to a reception of the third message at the CU, receiving downlink data from the CU based on the downlink data delivery information, before transmitting a fourth message associated with a radio resource control (RRC) reconfiguration complete based on the random access procedure of the terminal to the CU.

9. The method of claim 8, wherein the downlink data delivery information includes information on unsuccessfully transmitted downlink data to the terminal, and wherein the downlink data delivery information further includes at least one of information on a successfully delivered packet or information on a lost packet.

10. The method of claim 8, further comprising transmitting the received downlink data to the terminal, before an RRC connection reconfiguration is completed.

11. A central unit (CU) of a base station, the CU comprising:

a transceiver; and a controller, which is configured to control the transceiver to:

transmit, to a source distributed unit (DU) of the base station, a first message related to a handover, receive, from the source DU, a second message for downlink data delivery information related to a packet data unit (PDU) transmitted from the source DU to a terminal, receive, from a target DU of the base station, a third message based on a random access procedure of the terminal toward the target DU, and in response to receiving the third message, transmit downlink data to the target DU based on the downlink data delivery information; before receiving a fourth message associated with a radio resource control (RRC) reconfiguration complete based on the random access procedure of the terminal from the target DU.

12. The CU of claim 11, wherein the downlink data delivery information includes information on unsuccessfully transmitted downlink data to the terminal.

13. The CU of claim 11, wherein the downlink data delivery information includes at least one of information on a successfully delivered packet or information on a lost packet.

14. CU of claim 11, wherein the first message includes packet data convergence protocol (PDCP) sequence number (SN) information for a first PDCP PDU, which is a first missing acknowledgement after a last PDCP PDU for which transmission has been confirmed.

15. A source distributed unit (DU) of a base station, the source DU comprising:

a transceiver; and a controller, which is configured to control the transceiver to:

receive, from a central unit (CU) of the base station, a first message related to a handover, and transmit, to the CU, a second message for downlink data delivery information related to a packet data unit (PDU) transmitted to a terminal, wherein a third message is transmitted from a target DU of the base station to the CU based on a random access procedure of the terminal toward the target DU, and wherein in response to a reception of the third message at the CU, downlink data is transmitted from the CU to the target DU, based on the downlink data delivery information, before a fourth message associated with a radio resource control (RRC) reconfiguration complete based on the random access procedure of the terminal is received at the CU.

16. The source DU of claim 15, wherein the downlink data delivery information includes information on unsuccessfully transmitted downlink data to the terminal, and
wherein the downlink data delivery information further includes at least one of information on a successfully delivered packet or information on a lost packet.

17. The source DU of claim 15, wherein the first message includes packet data convergence protocol (PDCP) sequence number (SN) information for a first PDCP PDU, which is a first missing acknowledgement after a last PDCP PDU for which transmission has been confirmed.

18. A target distributed unit (DU) of a base station, the target DU comprising:
a transceiver; and
a controller, which is configured to control the transceiver to:
transmit, to a central unit (CU) of the base station, if a first message related to a handover is transmitted from the CU of the base station to a source DU of the base station and a second message for downlink data delivery information related to a packet data unit (PDU) transmitted from the source DU to a terminal is transmitted from the source DU to the CU, a third message based on a random access procedure of the terminal toward the target DU, and
in response to a reception of the third message at the CU, receive downlink data from the CU based on the downlink data delivery information, before transmitting a fourth message associated with a radio resource control (RRC) reconfiguration complete based on the random access procedure of the terminal to the CU.

19. The target DU of claim 18, wherein the downlink data delivery information includes information on unsuccessfully transmitted downlink data to the terminal, and
wherein the downlink data delivery information further includes at least one of information on a successfully delivered packet or information on a lost pack.

20. The target DU of claim 18, wherein the controller is further configured to control the transceiver to transmit the received downlink data to the terminal, before an RRC connection reconfiguration is completed.

21. A method by a central unit (CU) of a base station, the method comprising:
transmitting, to a source distributed unit (DU) of the base station, a first message related to a handover;
receiving, from the source DU, a second message for downlink data delivery information related to a packet data unit (PDU) transmitted from the source DU to a terminal;
receiving, from a target DU of the base station, a third message based on a random access procedure of the terminal toward the target DU; and
transmitting, to the target DU, downlink data based on the downlink data delivery information after receiving the third message.

22. A method by a target distributed unit (DU) of a base station, the method comprising:
transmitting, to a central unit (CU) of the base station, if a first message related to a handover is transmitted from the CU of the base station to a source DU of the base station and a second message for downlink data delivery information related to a packet data unit (PDU) transmitted from the source DU to a terminal is transmitted from the source DU to the CU, a third message based on a random access procedure of the terminal toward the target DU; and
receiving, from the CU, downlink data based on the downlink data delivery information after a reception of the third message at the CU.

23. A central unit (CU) of a base station, the CU comprising:
a transceiver; and
a controller, which is configured to control the transceiver to:
transmit, to a source distributed unit (DU) of the base station, a first message related to a handover,
receive, from the source DU, a second message for downlink data delivery information related to a packet data unit (PDU) transmitted from the source DU to a terminal,
receive, from a target DU of the base station, a third message based on a random access procedure of the terminal toward the target DU, and
transmit, to the target DU, downlink data based on the downlink data delivery information after a reception of the third message.

24. A target distributed unit (DU) of a base station, the target DU comprising:
a transceiver; and
a controller, which is configured to control the transceiver to:
transmit, to a central unit (CU) of the base station, if a first message related to a handover is transmitted from the CU of the base station to a source DU of the base station and a second message for downlink data delivery information related to a packet data unit (PDU) transmitted from the source DU to a terminal is transmitted from the source DU to the CU, a third message based on a random access procedure of the terminal toward the target DU, and
receive, from the CU, downlink data based on the downlink data delivery information after a reception of the third message at the CU.

* * * * *